United States Patent
Shaw (10) Patent No.: US 10,286,544 B2
(45) Date of Patent: May 14, 2019

(54) JIG ASSEMBLY

(71) Applicant: John Shaw, Glasgow (GB)

(72) Inventor: John Shaw, Glasgow (GB)

(73) Assignee: Sustain (Scotland) Limited, Glasgow (GB)

( * ) Notice: Subject to any disclaimer, the term of this patent is extended or adjusted under 35 U.S.C. 154(b) by 139 days.

(21) Appl. No.: 15/310,578

(22) PCT Filed: May 13, 2015

(86) PCT No.: PCT/GB2015/051397
§ 371 (c)(1),
(2) Date: Nov. 11, 2016

(87) PCT Pub. No.: WO2015/173559
PCT Pub. Date: Nov. 19, 2015

(65) Prior Publication Data
US 2017/0072556 A1    Mar. 16, 2017

(30) Foreign Application Priority Data
May 14, 2014    (GB) .................................. 1408583.1

(51) Int. Cl.
*G01B 5/14*    (2006.01)
*B25H 7/00*    (2006.01)
*B23B 47/28*    (2006.01)

(52) U.S. Cl.
CPC ............. *B25H 7/00* (2013.01); *B23B 47/287* (2013.01); *G01B 5/14* (2013.01); *B23B 2247/12* (2013.01)

(58) Field of Classification Search
CPC ..... B23B 2247/12; B23B 47/287; B25H 7/00; G01B 5/14

USPC .................................... 33/613, 645, 528, 194
See application file for complete search history.

(56) References Cited

U.S. PATENT DOCUMENTS

| | | | |
|---|---|---|---|
| 1,412,087 A | 4/1922 | Ottinger | |
| 2,582,606 A | 1/1952 | Riddle | |
| 2,821,027 A | 1/1958 | Billhimer, Sr. | |
| 2,842,860 A | 7/1958 | Gray | |

(Continued)

FOREIGN PATENT DOCUMENTS

| | | |
|---|---|---|
| CA | 2469735 A1 | 3/2005 |
| FR | 2240799 A1 | 3/1975 |

(Continued)

OTHER PUBLICATIONS

GB Examination Report for Application No. GB1408583.1 dated Sep. 8, 2015; 2 pages.

(Continued)

*Primary Examiner* — Yaritza Guadalupe-McCall
(74) *Attorney, Agent, or Firm* — Benesch, Friedlander, Coplan & Aronoff LLP (57) ABSTRACT

A jig assembly (10) for location with respect to a first item of furniture, such as a door or drawer front, to which a second item of furniture, such as a handle, is to be secured. The jig assembly (10) comprises a first member in the form of first block (12) and a second member in the form of second block (14), the first block (12) and the second block (14) being configured to be coupled together by a spacer (16). The spacer (16) may comprise, may be identical to, or may correspond to, a handle (18) corresponding to that which is to be secured to the door or drawer front.

20 Claims, 10 Drawing Sheets

(56) References Cited

U.S. PATENT DOCUMENTS

| | | | | |
|---|---|---|---|---|
| 3,583,823 | A * | 6/1971 | Eaton | B23B 49/02 33/667 |
| 5,163,233 | A * | 11/1992 | Benson | E04G 21/1841 33/613 |
| 5,191,718 | A * | 3/1993 | Fox | E04C 1/42 33/526 |
| 5,222,845 | A | 6/1993 | Goldstein | |
| 5,491,905 | A * | 2/1996 | Jablonski | E04F 21/00 33/481 |
| 5,507,607 | A * | 4/1996 | Ericksen | B23B 47/287 408/108 |
| 5,590,986 | A * | 1/1997 | Juang | B23B 47/287 408/115 R |
| 5,807,036 | A | 9/1998 | Lostlen | |
| 6,343,632 | B1 * | 2/2002 | Zivojinovic | B23B 47/287 33/539 |
| 6,510,616 | B1 * | 1/2003 | Sparkman | E04F 21/26 33/456 |
| 6,796,049 | B1 * | 9/2004 | Claxton | E04F 21/0092 33/527 |
| 6,979,299 | B2 * | 12/2005 | Peabody | A61B 5/1072 33/511 |
| 7,003,889 | B1 | 2/2006 | Luciani | |
| 7,377,048 | B2 * | 5/2008 | Koetter | E04B 7/022 33/613 |
| 8,201,343 | B2 * | 6/2012 | Morris | E04G 21/1891 33/613 |
| 9,333,642 | B2 * | 5/2016 | Courtney | B25H 7/04 |
| 2002/0069546 | A1 * | 6/2002 | Claxton | E04F 21/0092 33/527 |
| 2002/0184778 | A1 * | 12/2002 | Yrazabal | H02G 1/00 33/528 |
| 2003/0009897 | A1 * | 1/2003 | Gonzales | E01C 19/506 33/645 |
| 2006/0010703 | A1 * | 1/2006 | Gauthier | E04G 21/1891 33/613 |
| 2006/0104730 | A1 | 5/2006 | Valdez | |
| 2006/0137162 | A1 | 6/2006 | Shishikura | |
| 2007/0009335 | A1 | 1/2007 | Brewington | |
| 2007/0036619 | A1 | 2/2007 | Miro | |
| 2007/0101598 | A1 | 5/2007 | Miro | |
| 2007/0119067 | A1 * | 5/2007 | Mackey | G01B 3/20 33/613 |
| 2008/0159821 | A1 | 7/2008 | Siegfried | |
| 2009/0100694 | A1 * | 4/2009 | Hooks | E04B 7/022 33/645 |
| 2009/0307917 | A1 * | 12/2009 | Allen | A44C 3/002 33/653 |
| 2015/0089825 | A1 * | 4/2015 | Jones | E04B 2/18 33/518 |
| 2016/0024791 | A1 * | 1/2016 | Reno | E04C 3/02 33/613 |
| 2017/0072556 | A1 * | 3/2017 | Shaw | B23B 47/287 |

FOREIGN PATENT DOCUMENTS

| | | |
|---|---|---|
| FR | 2838149 A1 | 10/2003 |
| GB | 154073 A | 11/1920 |
| GB | 2460836 A | 12/2009 |
| WO | 2007123415 A1 | 11/2007 |

OTHER PUBLICATIONS

GB Examination Report for Application No. GB1408583.1 dated Dec. 17, 2015; 2 pages.

GB Search Report for Application No. GB1408583.1 dated Oct. 7, 2014; 1 pages.

Notification of Transmittal of the International Search Report aof the International Searching Authority, or the Declaration; PCT/GB2015/051397; dated Sep. 1, 2015; 4 pages.

Written Opinion of the International Searching Authority; PCT/GB2015051397; dated Sep. 1, 2015. 7 pages.

* cited by examiner

JIG ASSEMBLY

CROSS REFERENCE TO RELATED APPLICATIONS

This is a US National Stage of Application No. PCT/GB2015/051397, filed on May 13, 2015, which claims the benefit of GB Application No. 1408583.1 filed May 14, 2014, the disclosures of which are incorporated herein by reference.

FIELD OF THE INVENTION

The present invention relates to a jig assembly for use in the construction of furniture, such as fitted kitchens and the like. More particularly, but not exclusively, embodiments of the present invention relate to a jig assembly used in securing a first item of furniture, such as a handle, to a second item of furniture, such as a door or drawer front.

BACKGROUND TO THE INVENTION

The construction and/or assembly of furniture, such as fitted kitchens, can be a significant undertaking and typically involves a large number of separate measurement, drilling and assembly operations. One such operation is the securement of handles to kitchen cabinet doors and/or drawer fronts, with each handle being secured to its respective door or drawer front by two bolts or screws disposed through drill holes in the door.

As door handles come in a vast variety of styles, shapes and sizes, it is common for kitchen manufacturers not to provide pre-drilled holes in their doors or drawer fronts. Thus, in order to secure a handle to a given door or drawer front, it is necessary to first accurately measure and mark the position of the required drill holes in each door before these can be drilled.

There are a number of drawbacks associated with conventional techniques. For example, the requirement to accurately measure and mark the position of numerous drill holes will often result in manual error. This may require the measuring and marking operations to be repeated, increasing the time required to complete the job. More significantly, if the error is not identified prior to drilling the drill holes the door and/or drawer front may need to be scrapped at significant expense, further increasing the time required to complete the job. The possibility of manual error may be further increased where the handle is to be attached to the door or drawer front in-situ, since this may require working at height or in locations where access is restricted. Moreover, it will be recognised that a typical kitchen construction will require the attachment of a number of handles (for example, one or two handles may be used for each cabinet and one handle for each drawer front), such that the required measuring, marking and drilling operations involve a significant amount of time.

SUMMARY OF THE INVENTION

According to a first aspect of the present invention, there is provided a jig assembly for use in securing a first item of furniture, such as a handle, to a second item of furniture, such as a door or drawer, the jig assembly comprising:

a first member comprising a first locator configured to indicate the position of a first attachment location between the first item of furniture and the second item of furniture; and a second member comprising a second locator configured to indicate the position of a second attachment location between the first item of furniture and the second item of furniture, wherein the first and second members are configured to be secured together by a spacer element which disposes the first and second members a predetermined distance apart so as to position the locators at the first and second attachment locations.

Beneficially, embodiments of the present invention provide a jig assembly which permits attachment locations for securing a first item of furniture—such as a handle or the like—to a second item of furniture—such as a door, drawer front or the like—to be quickly and accurately determined and/or formed in the second item of furniture, thereby obviating the laborious requirement for repeated manual operations, saving time and reducing the risk of error and the resulting wastage which may otherwise occur.

In particular embodiments, the spacer element may comprise, may be identical to, or may correspond to, the first item of furniture to be secured to the second item of furniture.

In embodiments where the first item of furniture comprises a handle and the second item of furniture comprises a door or drawer front, the spacer element may for example comprise the specific handle to be secured to the door or drawer front, an identical handle or other handle having attachment locations corresponding to that of the handle to be secured. Beneficially, this means that no additional assembly components are required, and permits the jig assembly to be readily tailored to whichever size is required for a particular job. Furthermore, in a job which involves the assembly of a plurality of identical handles to their respective doors, it is envisaged that one such handle can be used in the jig assembly to facilitate location and/or formation of attachment locations for securing a plurality of handles to their respective doors or drawer fronts, and in particular but not exclusively all but one of the handles; the jig assembly then being disassembled and the handle forming the spacer element attached to the final door or drawer front.

In some embodiments, the jig assembly may comprise the spacer element. For example, the jig assembly may be supplied together with the spacer element.

In other embodiments, the spacer element may be used in conjunction with the jig assembly, the first and second members of the jig assembly being assembled with the spacer element on site.

The spacer element may be of any suitable form and construction.

The spacer element may dispose the first and second members a predetermined distance apart so as to position the first and second locators at a distance apart corresponding to that between the first and second attachment locations. More particularly, the spacer element may dispose the first and second members a predetermined distance apart so as to position the first and second locators at an axial distance apart corresponding to that between the first and second attachment locations. The predetermined distance may thus comprise a fixed distance, but one which may be adapted depending on the spacer element selected.

The spacer element may comprise a longitudinal axis. The jig assembly may be configured so that the longitudinal axis of the spacer element when coupled to the first and second members is perpendicular or substantially perpendicular, to a longitudinal axis of the first item of furniture when secured to the second item of furniture.

The first member may be of any suitable form and construction.

The first member may comprise the first locator. The first locator may be formed or disposed in the first member.

The first locator may be of any suitable form or construction. In particular embodiments, the first locator may comprise a locator hole. In some instances, the first locator may be configured to permit the first attachment location to be marked onto the second item of furniture. For example, the first locator may be sized and/or dimensioned to permit a marker to be disposed therethrough. Alternatively or additionally, the first locator may permit the attachment location to be formed in the second item of furniture. For example, the first locator may be sized and/or dimensioned to permit a drill, punch or the like to be disposed therethrough.

The first locator may comprise a mark, line or profile formed in or on the first member.

The first member may comprise a front portion. The front portion of the first member may comprise the first locator. For example, the first locator may be formed or disposed in the front portion of the first member.

The first member may comprise a back portion. The back portion may comprise the first locator. For example, the first locator may be formed or disposed in the back portion or the first member.

In some embodiments, both the front portion and the back portion may comprise the first locator. For example, the first locator may be formed or disposed in both the front and back portion of the first member. The first locator may extend through the first member, more particularly through the front portion and the back portion of the first member. This permits the jig assembly to be used in different orientations and/or permits the first attachment location to be marked and/or formed in either side of the second item of furniture.

The first member may comprise a base portion.

The first member may comprise an end portion. The end portion may be configured to receive part of the first item of furniture, for example a first end of the first item of furniture. In particular embodiments, the end portion of the first member may comprise a bore for receiving the first item of furniture, for example the first end of the first item of furniture.

The assembly may comprise a fastener for securing the first item of furniture to the first member. The fastener may be of any suitable form and construction. For example, the fastener may comprise a mechanical fastener, such as a nut and bolt, a screw, or the like. In particular embodiments, the fastener may comprise, may be identical to, or may correspond to, a fastener used to secure the first item of furniture to the second item of furniture. The use of a fastener comprising that which is used to secure the first item of furniture to the second item of furniture beneficially means that no additional assembly components are required, and means that no specialised fixings are required to assembly the jig assembly.

The front portion of the first member may be trapezoidal in shape. For example, the front portion of the first member may comprise a tapered end region.

The back portion of the first member may be trapezoidal in shape. For example, the back portion of the first member may comprise a tapered end region.

The provision of tapered end regions on either or both of the front portion and the back portion of the first member may assist a user in correctly orienting the jig assembly in use, and/or may reduce material costs in production.

The first member may be modular in construction. For example, two or more of the base portion, front portion, back portion and end portion may comprise separate components which are adapted to be coupled together. A modular construction increases the flexibility of construction in that the jig assembly may comprise a number of end portions of different thicknesses, thereby permitting the assembly to be utilised with doors and/or drawer fronts of different thicknesses.

Alternatively, the first member may be unitary in construction, with the base portion, front portion, back portion and end portion formed as a single piece construction.

The second member may be of any suitable form and construction.

The second member may comprise the second locator. The second locator may be formed or disposed in the second member.

The second locator may be of any suitable form or construction. In particular embodiments, the second locator may comprise a locator hole. In some embodiments, the second locator may be configured to permit the second attachment location to be marked onto the second item of furniture. For example, the second locator may be sized and/or dimensioned to permit a marker to be disposed therethrough. Alternatively or additionally, the second locator may permit the second attachment location to be formed in the second item of furniture. For example, the second locator may be sized and/or dimensioned to permit a drill, punch or the like to be disposed therethrough.

The second locator may comprise a mark, line or profile formed in or on the second member.

The second member may comprise a front portion. The front portion of the second member may comprise the second locator. For example, the second locator may be formed or disposed in the front portion of the second member.

The second member may comprise a back portion. The back portion of the second member may comprise the second locator. For example, the second locator may be formed or disposed in the back portion or the second member.

In some embodiments, both the front portion and the back portion of the second member may comprise the second locator. For example, the second locator may be formed or disposed in both the front and back portion of the second member. The second locator may extend through the second member, more particularly through the front portion and the back portion of the second member. This permits the jig assembly to be used in different orientations and/or permits the second attachment location to be marked and/or formed in either side of the second item of furniture.

The second member may comprise an end portion. The end portion may be configured to receive part of the first item of furniture, for example a second end of the first item of furniture. In particular embodiments, the end portion of the second member may comprise a bore for receiving the first item of furniture, for example the second end of the first item of furniture.

The assembly may comprise a fastener for securing the first item of furniture to the second member. The fastener may be of any suitable form and construction. For example, the fastener may comprise a mechanical fastener, such as a nut and bolt, a screw, or the like. In particular embodiments, the fastener may comprise, may be identical to, or may correspond to, a fastener used to secure the first item of furniture to the second item of furniture. As described above, the use of a fastener comprising that which is used to secure the first item of furniture to the second item of furniture beneficially means that no additional assembly components are required, and means that no specialised fixings are required to assembly the jig assembly.

The second member may be modular in construction. For example, two or more of the base portion, front portion and end portion of the second member may comprise separate components which are adapted to be coupled together. A modular construction increases the flexibility of construction in that the jig assembly may comprise a number of end portions of different thicknesses, thereby permitting the assembly to be utilised with doors and/or drawer fronts of different thicknesses.

Alternatively, the second member may be unitary in construction, with the front portion, back portion and end portion formed as a single piece construction. Thus, in use the jig assembly may be assembled by coupling the first end of the first item of furniture, such as the handle, to the first member and the second end of the first item of furniture to the second member.

The jig assembly may further comprise a positioning arrangement. The positioning arrangement may be configured to position the first member and second member with respect to the second item of furniture, such as a given door or drawer front.

The positioning arrangement may be configured to dispose the first member at a given location with respect to the second item of furniture so as to position the first and second locators at a distance apart corresponding to that between the first and second attachment locations. The given location may comprise a given distance from an edge of the second item of furniture, for example an edge of a given door or drawer front.

In some embodiments, the positioning arrangement may be configured so that the distance between the first member and the edge of the second item of furniture is fixed. However, in particular embodiments the positioning arrangement may be configured so that the distance between the first member and the edge of the second item of furniture may be varied or adapted.

The postioning arrangement may be configured so that the first member may be disposed at a plurality of discrete locations relative to the second item of furniture, for example the edge of the second item of furniture.

In use, the positioning arrangement beneficially permits the jig assembly to be used to assemble a given type of handle to doors or drawer fronts of different sizes. For example, it is common for kitchens to comprise cabinets of different widths to permit the kitchen to fit rooms of different dimensions, and for a common size of handle to be used for consistency of appearance and ease of use. Embodiments of the present invention thus facilitate the quick and accurate securing of a common handle to a number of different door and drawer front forms.

The positioning arrangement may be of any suitable form and construction.

The jig assembly may comprise a third member. The third member may comprise part of the positioning arrangement of the jig assembly.

The jig assembly may comprise an axle. The axle may comprise part of the positioning arrangement of the jig assembly.

The third member may be slidably disposed with respect the axle. The axle may be disposed in or attached to the first member. In use, the sliding engagement between the third member and the axle permits the assembly to be reconfigured from a first configuration where the first member is disposed at a given location with respect to the second item of furniture to a second configuration where the first member is disposed at a different location with respect to the second item of furniture.

The axle may be of any suitable form and construction, such as a rod, tube or the like.

The third member may be of any suitable form and construction.

The third member may comprise a front portion.

The third member may comprise a back portion.

The third member may comprise an end portion. The end portion of the third member may be configured to receive part of the axle. The end portion may comprise a bore for receiving said part of the axle.

The third member may be modular in construction. For example, two or more of the front portion, back portion and end portion of the third member may comprise separate components which are adapted to be coupled together. A modular construction increases the flexibility of construction in that the jig assembly may comprise a number of end portions of different thicknesses, thereby permitting the assembly to be utilised with doors and/or drawer fronts of different thicknesses.

Alternatively, the third member may be unitary in construction, with the front portion, back portion and end portion of the third member formed as a single piece construction.

The jig assembly may comprise a lock arrangement. The lock arrangement may be configured to lock the first member at a given location with respect to the second item of furniture—or in embodiments where there are a plurality of given locations at one such location.

The lock arrangement may be of any suitable form and construction.

The lock arrangement may comprise a clamp, a thumb press, a nut, a pin configured for location in a hole or slot, or other suitable lock arrangement.

According to a second aspect of the present invention there is provided a kit of parts comprising a jig assembly according to the first aspect and at least one spacer element.

In particular embodiments, the kit of parts may comprise a plurality of spacer elements. The spacer element may be of any suitable form. In embodiments comprising a plurality of spacer elements, at least two of the spacer elements may be of different form, in particular but not exclusively of different length.

According to a third aspect of the present invention there is provided a method comprising:

providing a jig assembly for securing a first item of furniture, such as a handle, to a second item of furniture, such as a door or drawer front, the jig assembly comprising: a first member comprising a first locator configured to indicate the position of a first attachment location between the first item of furniture and the second item of furniture; and a second member comprising a second locator configured to indicate the position of a second attachment location between the first item of furniture and the second item of furniture, securing the first and second members together with a spacer element configured to dispose the first and second members a predetermined distance apart so as to position the locators at the first and second attachment locations.

The method may comprise disposing the jig assembly with respect to a second item of furniture, such as a door or drawer front.

The method may comprise marking the first and second attachments location on the second item of furniture.

Alternatively or additionally, the method may comprise forming the first and second attachment locations on the second item of furniture.

Forming the first and second attachment locations may be performed by any suitable means. For example, forming the first and second attachment locations may comprise forming first and second drill holes in the second item of furniture. The drill holes may comprise pilot holes.

In some embodiments, at least one of the first locator and the second locator may be configured to control the depth of hole formed in the second item of furniture. For example, one of more of the locators may comprise a countersunk bore configured to limit penetration of a drill bit through said locator.

It should be understood that the features defined above in accordance with any aspect of the present invention or below in relation to any specific embodiment of the invention may be utilised, either alone or in combination with any other defined feature, in any other aspect or embodiment of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
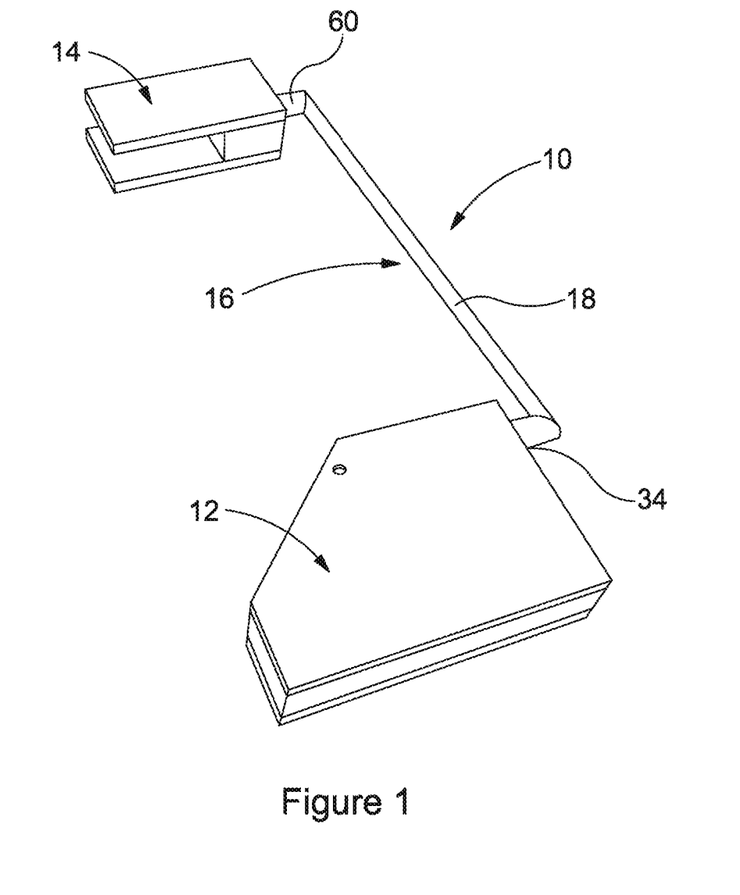
FIG. 1 shows a perspective view of a jig assembly according to a first embodiment of the present invention.

FIG. 1 shows a perspective view of a jig assembly 10 according to an embodiment of the present invention. In use, the jig assembly 10 is configured for location with respect to a door D (see FIGS. 4 and 5) to which a handle is to be secured and permits the accurate indication of the positions of drill holes H in the door D to be determined without the requirement to manually measure, mark and drill the drill holes H separately.

As shown in FIG. 1, the jig assembly 10 comprises a first member in the form of first block 12 and a second member in the form of second block 14 which are configured to be coupled together by a spacer 16. In the embodiment shown, the spacer 16 comprises a handle 18 corresponding to that which is to be secured to the door D, although it will be recognised that the spacer 16 may alternatively comprise the handle to be secured to the door itself following formation of the drill holes H or another spacer having dimensions corresponding to that of the handle to be secured.

Figure 2A:
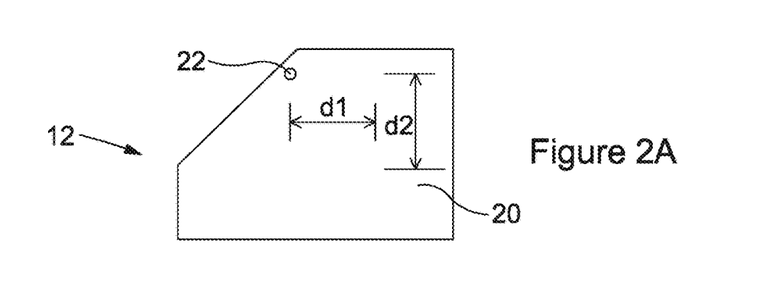
FIG. 2A shows a front view of a first member of the jig assembly shown in FIG. 1.
Figure 2B:
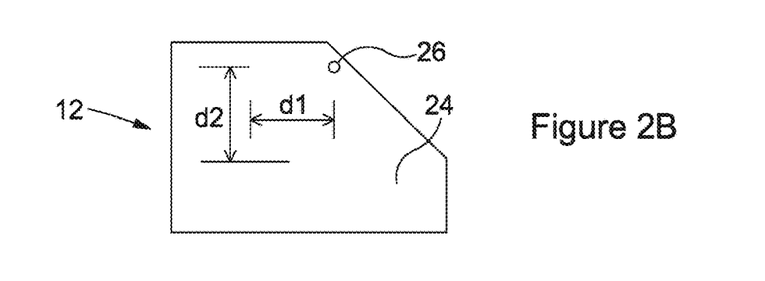
FIG. 2B shows a back view of the first member shown in FIG. 2A.

As shown in FIG. 1, and referring now also to FIGS. 2A to 2D, the first block 12 comprises a front portion 20 having a locator hole 22 (shown most clearly in FIG. 2A) and a back portion 24 having a locator hole 26 (shown most clearly in FIG. 2B). In use, the locator holes 22, 26 form a first locator of the jig assembly 10 for indicating the position on the door D at which a first of the drill holes H should be marked and/or formed (in the illustrated embodiment the lower of the hole H in FIGS. 4 and 5).

Figure 2C:
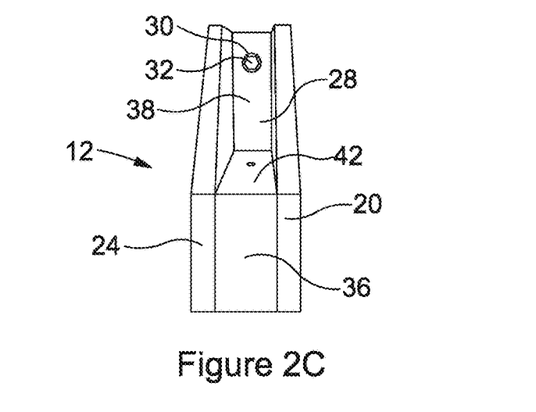
FIG. 2C shows a left end view of the first member shown in FIGS. 2A and 2B.
Figure 2D:
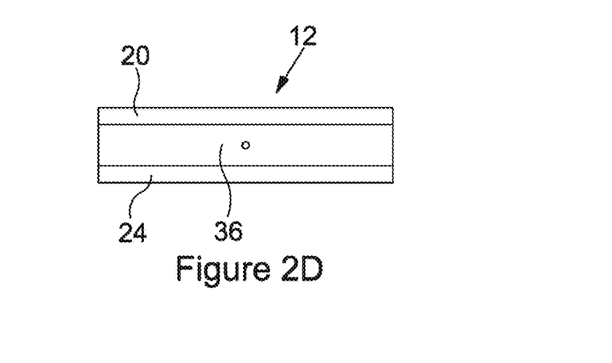
FIG. 2D shows a bottom view of the first member shown in FIGS. 2A, 2B and 2C.
Figure 3A:
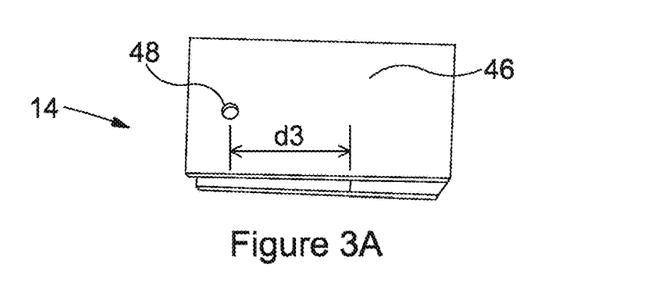
FIG. 3A shows a front view of a second member of the jig assembly shown in FIG. 1.
Figure 3B:
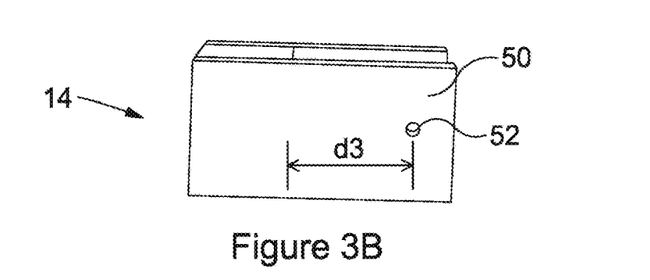
FIG. 3B shows a back view of the second member shown in FIG. 3A.
Figure 3C:
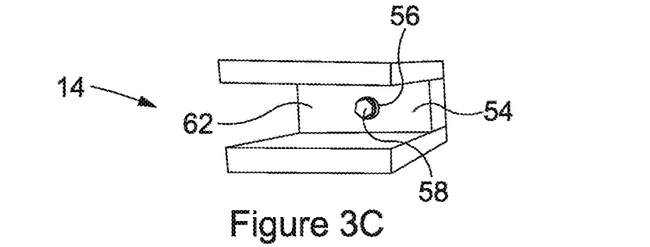
FIG. 3C shows a left end view of the second member shown in FIGS. 3A and 3B.
Figure 3D:
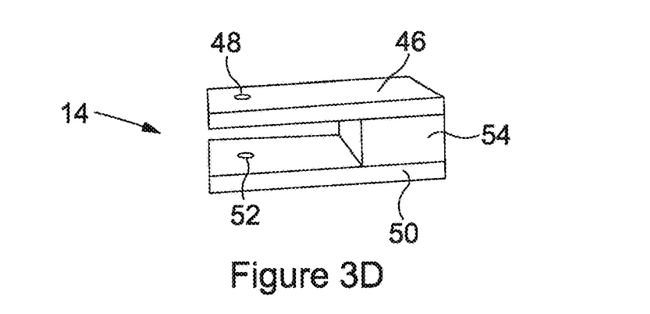
FIG. 3D shows a bottom view of the second member shown in FIGS. 3A, 3B and 3C.

The first block 12 further comprises an end portion 28 of the first block 12 having a bore 30 for receiving a bolt 32 for securing the first block 12 to a first end portion 34 of the handle 18 (see FIGS. 2C and FIG. 1), and a base portion 36 (shown most clearly in FIG. 2D).

Figure 4:
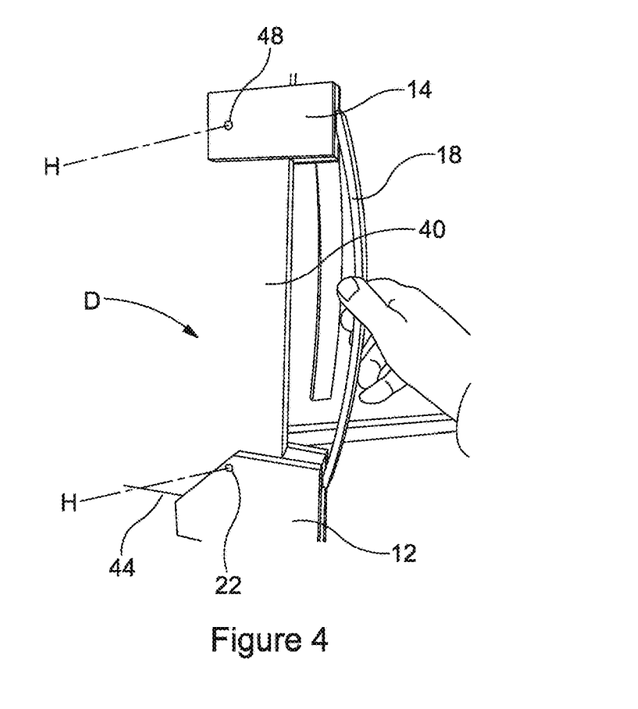
FIG. 4 shows the jig assembly shown in FIG. 1 in operation, in a first orientation.

In use, the first block 12 forms a corner piece of the jig assembly 10 and is configured to be positioned over the lower corner of the door D so that an inner surface 38 of the end portion 28 contacts a distal end surface 40 of the door D and an inner surface 42 of the base portion 36 contacts the lower surface 44 of the door D (see FIGS. 2C and 4). The first block 12 thus provides a location for the locator holes 22, 26 which is a fixed distance d1 from the distal end surface 40 of the door D and also a fixed distance d2 from the lower surface 44 of the door D.

Figure 5:
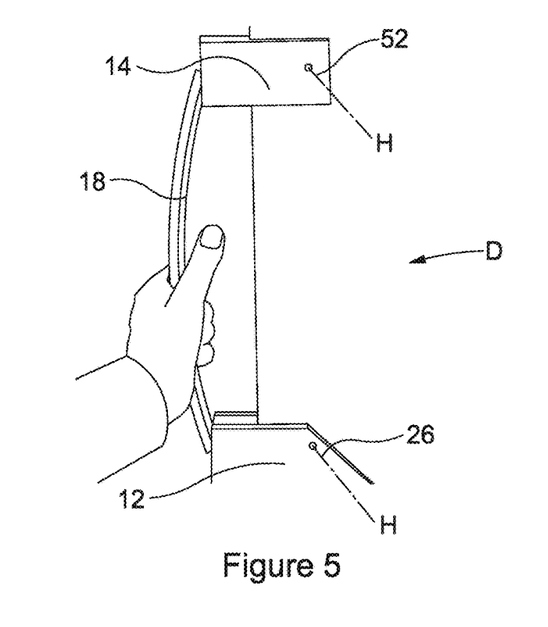
FIG. 5 shows the jig assembly of FIG. 1 in operation, in a second orientation.

In the embodiment shown, the front and back portions 20, 24 of the first block 12 are trapezoidal in shape with the distal ends of the front and back portions 20, 24 being tapered. This assists a user in correctly orienting the assembly 10 in use as shown in FIGS. 4 and 5, and reduces material costs in production.

In the illustrated embodiment, the first block 12 is modular in that the front portion 20, back portion 24, end portion 28 and base portion 36 comprise separate components which are adapted to be coupled together. A modular construction increases the flexibility of construction in that the jig assembly 10 may comprise a number of end portions 28 of different thicknesses, thereby permitting the jig assembly 10 to be utilised with doors D and/or drawer fronts (see drawer front F in FIG. 7) of different thicknesses. However, in other embodiments, the first block 12 may be unitary in construction, with the front portion 20, back portion 24, end portion 28 and base portion 36 formed as a single piece construction.

Referring now also to FIGS. 3A to 3D of the accompanying drawings, the second block 14 comprises a front portion 46 having a locator hole 48 and a back portion 50 having a locator hole 52. In use, the locator holes 48, 52 form a second locator of the jig assembly 10 for indicating the position on the door D at which a second of the drill holes H should be marked and/or formed.

The second block 14 further comprises an end portion 54 and, as with the first block 12, the end portion 54 of the second block 14 has a bore 56 for receiving a bolt 58 for securing the second block 14 to a second end portion 60 of the handle 18.

In use, the second block 14 forms a follower block of the jig assembly 10 and is configured to be positioned over the door D so that inner surface 62 of the end portion 54 contacts surface 40 of door D, the location of the second block 14 relative to the first block 12 being dependent on the length of the handle 18. However, it will be recognised that the second block 14 also provides a location for the locator holes 48, 52 which is a fixed distance d3 from the distal end surface 40 of the door D and that the distance d3 is equal to the distance d1, thus permitting the drill holes H to be marked and/or drilled accurately at the same distance from the distal end surface 40 of the door D.

In the illustrated embodiment, the second block 14 is modular in that the front portion 46, back portion 50 and end portion 54 comprise separate components which are adapted to be coupled together. A modular construction increases the flexibility of construction in that the jig assembly 10 may comprise a number of end portions 54 of different thicknesses, thereby permitting the assembly 10 to be utilised with doors D and/or drawer fronts F (see FIG. 7) of different thicknesses. A modular construction may be more appropriate for example but not exclusively by a professional user who may utilise the assembly 10 in a number of different installations. However, in other embodiments the second block 14 may be unitary in construction, with the front portion 46, back portion 50 and end portion 54 formed as a single piece construction. A unitary construction may be more appropriate for example but not exclusively by a non-professional user or for supply by a manufacturer.

Assembly and operation of the jig assembly 10 will now be described with reference to FIGS. 1 to 3D, and also FIGS. 4 and 5 which show the jig assembly 10 in use, in first and second orientations.

The jig assembly 10 is first assembled by securing the handle 18 to the first and second blocks 12, 14 using the bolts 32, 58 disposed through the respective bores 30, 56 in the end portions 28, 54 of the first and second blocks 12, 14. The jig assembly 10 is then able to be manipulated using the handle 18 so that the assembly 10 is positioned with respect to a door D, as shown in FIGS. 4 and 5. As can be seen from FIGS. 4 and 5, the assembly 10 can be oriented in either a right hand orientation (as in FIG. 4) or in a left hand orientation (as shown in FIG. 5), as required by the user and can be handled using one hand, leaving the users other hand free to mark and/or form the required drill holes H.

As shown in FIG. 4, the jig assembly 10 is positioned over the lower corner of the door D so that the surface 38 of the first block 12 and the surface 62 of the second block 14 contact the edge 40 of the door D and so that the surface 42 of the first block 12 contacts the surface 44 of the door D. In this position, the locator holes 22, 26 are positioned to locate the first of the drill holes H and the locator holes 48, 52 are positioned to locate the second of the drill holes H.

Figure 6:
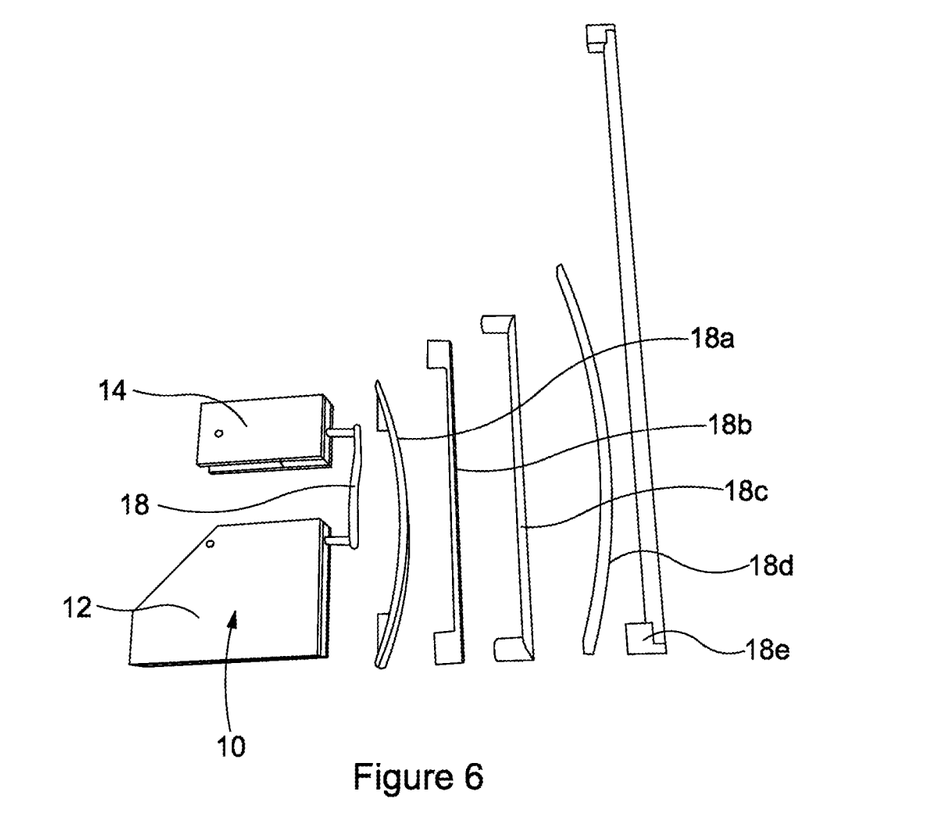
FIG. 6 shows an exemplary kit of parts comprising the jig assembly coupled to a spacer element and a plurality of alternative spacer elements which may be used with the present invention.

It will be recognised that the assembly 10 permits attachment locations for securing a first item of furniture—such as a handle or the like—to a second item of furniture—such as a door, drawer front or the like—to be quickly and accurately determined and/or formed in the second item of furniture, thereby obviating the laborious requirement for repeated manual operations, saving time and reducing the risk of error and the resulting wastage which may otherwise occur, and that the assembly 10 can be quickly and easily reconfigured using different handles as spacers. FIG. 6, for example, shows an exemplary kit of parts comprising an assembly 10 secured to a handle 18, together with a number of alternative handles 18a, 18b, 18c, 18d and 18e which can be substituted for the handle 18.

It should be understood that the embodiments described herein are merely exemplary and that various modifications may be made thereto without departing from the scope of the invention.

Referring now to FIGS. 7 to 12 of the accompanying drawings, there is shown a jig assembly 110 according to a second embodiment of the present invention. The jig assembly 110 is similar to the jig assembly 10 and corresponding components are represented by like numerals incremented by 100.

Figure 7:
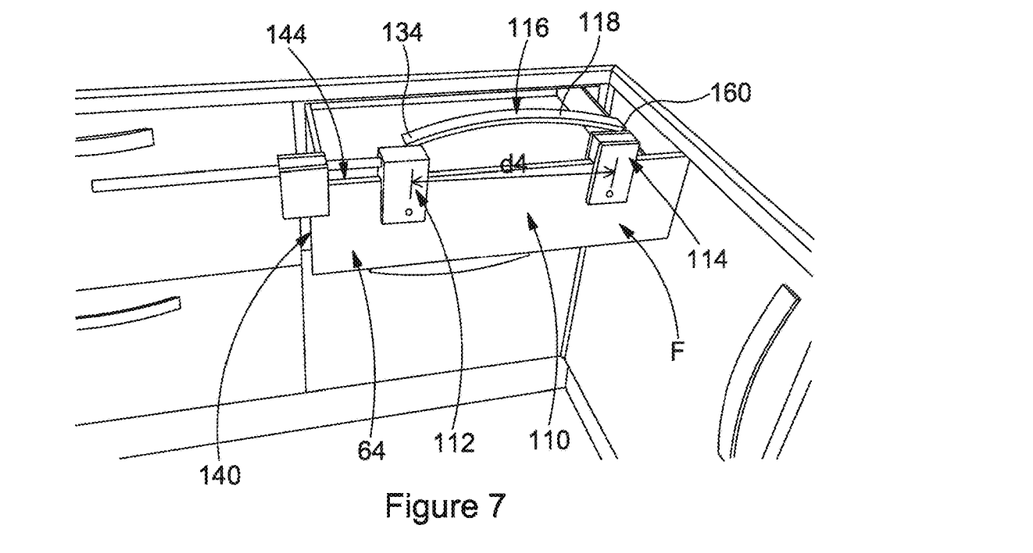
FIG. 7 shows a jig assembly according to a second embodiment of the present invention, in operation.

In use, and as shown in FIG. 7, the jig assembly 110 is configured for location with respect to a drawer front F to which a handle is to be secured and comprises a first member in the block 112 and a second block 114. The first block 112 and the second block 114 are configured to be coupled together by a spacer 116, which in the illustrated embodiment comprises a handle 118 corresponding to that to be secured to the drawer front F.

Figure 8:
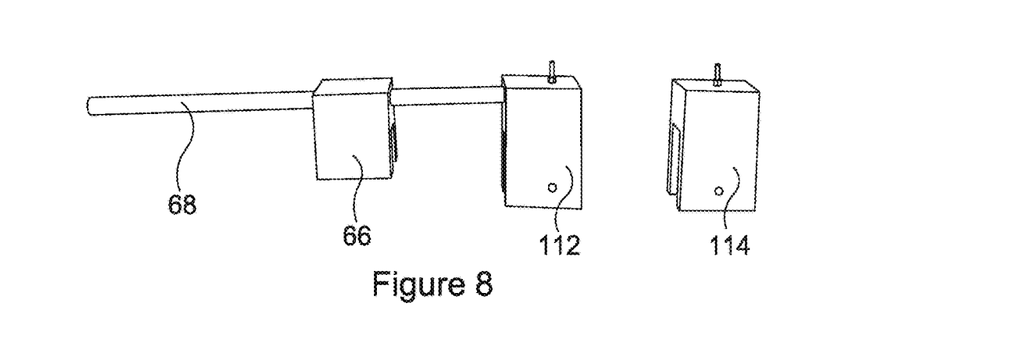
FIG. 8 shows a front view of the jig assembly shown in FIG. 7.
Figure 9:
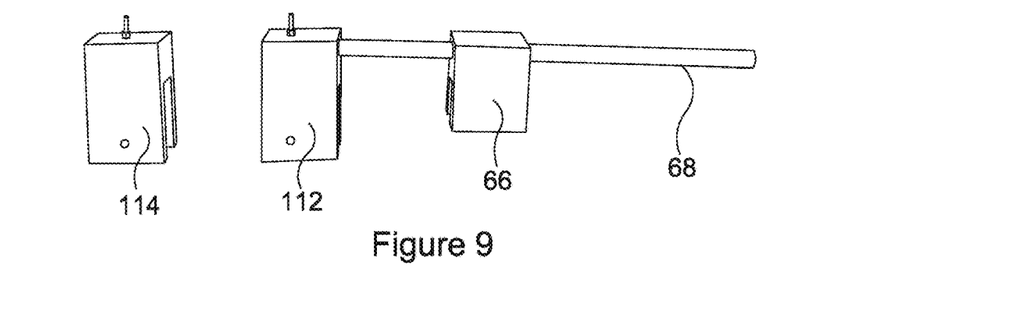
FIG. 9 shows a back view of the jig assembly shown in FIGS. 7 and 8.
Figure 10A:
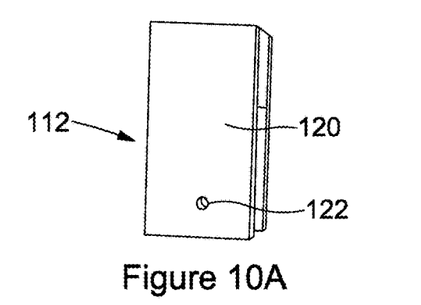
FIG. 10A shows a front view of a first member of the jig assembly shown in FIGS. 7 to 9.
Figure 10B:
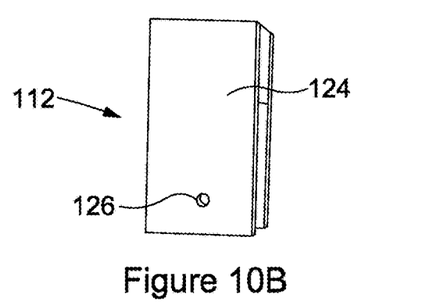
FIG. 10B shows a back view of the first member shown in FIG. 10A.
Figure 10C:
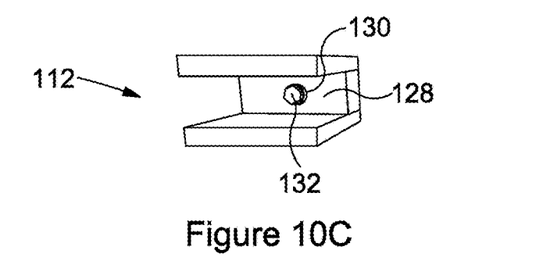
FIG. 10C shows a bottom view of the first member shown in FIGS. 10A and 10B.
Figure 10D:
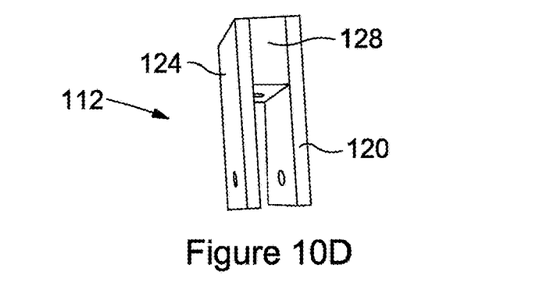
FIG. 10D shows a left end view of the first member shown in FIGS. 10A, 10B and 10C.
Figure 11A:
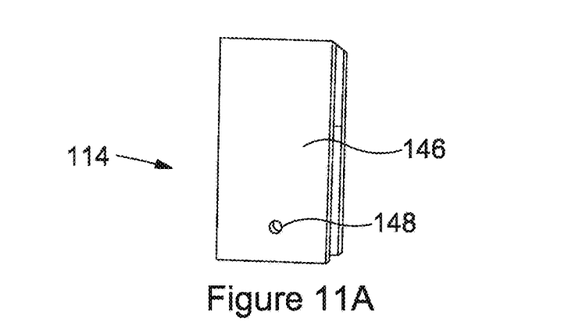
FIG. 11A shows a front view of a second member of the jig assembly shown in FIGS. 7 to 9.
Figure 11B:
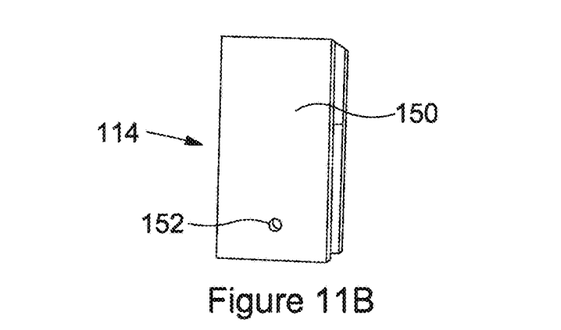
FIG. 11B shows a back view of the second member shown in FIG. 11A.
Figure 11C:
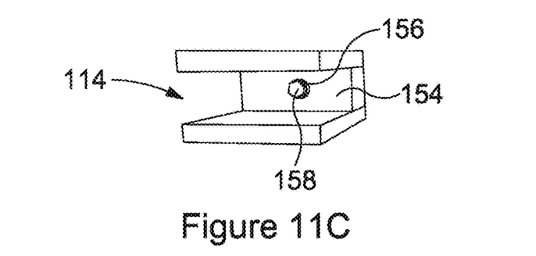
FIG. 11C shows a bottom view of the second member shown in FIGS. 11A and 11B.
Figure 11D:
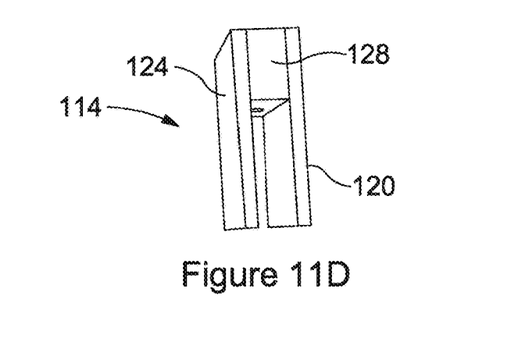
FIG. 11D shows a left end view of the second member shown in FIGS. 11A, 11B and 11C.

As in the assembly 10, the first block 112 comprises a front portion 120 having a locator hole 122 and a back portion 124 having a locator hole 126. The first block 112 further comprises an end portion 128 having a bore 130 for receiving a bolt 132 for securing the first block 112 to a first end portion 134 of the handle 118. The second block 114 comprises a front portion 146 having a locator hole 148 and a back portion 150 having a locator hole 152. The second block 114 further comprises an end portion 154 and, as with the first block 112, the end portion 154 of the second block 114 has a bore 156 for receiving a bolt 158 for securing the second block 114 to a second end portion 160 of the handle 118.

In use, the locator holes 122, 126 form a first locator of the jig assembly 110 for indicating the position on the drawer front F at which a first of the drill holes H should be marked and/or formed and the locator holes 148, 152 form a second locator of the jig assembly 110 for indicating the position on the drawer front F at which a second of the drill holes H should be marked and/or formed However, whereas in the assembly 10 the first block 12 is positioned over the lower corner of the door D, in this second embodiment both the first block 112 and the second block 114 are positioned over top surface 144 of drawer front F. Moreover, the distance between the first block 112 and end surface 140 of the drawer front F may be altered using a positioning arrangement 64, as will be described below with reference in particular to FIGS. 8 and 9 and FIGS. 12A to 12C.

As shown in FIGS. 8 and 9, jig assembly 110 further comprises a positioning arrangement, generally indicated by 64—comprising a third member in the form of third block 66—which forms the corner piece of the jig assembly 110—and an axle 68 which is disposed through the third block 66 and which is secured to the first block 112. In use, the positioning arrangement 64 is configured so that the third block 66 is axially slidable on the axle 68.

Figure 12A:
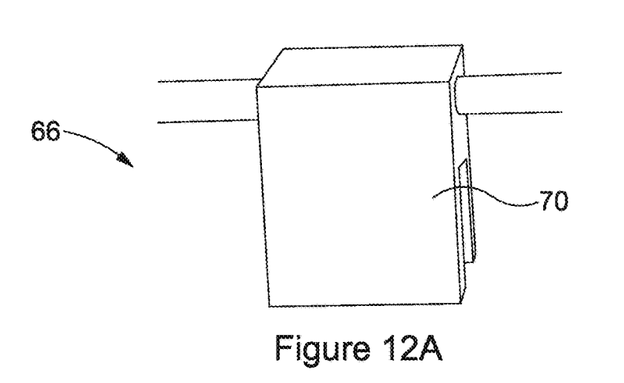
FIG. 12A shows a front view of a third member of the jig assembly shown in FIGS. 7 to 9.
Figure 12B:
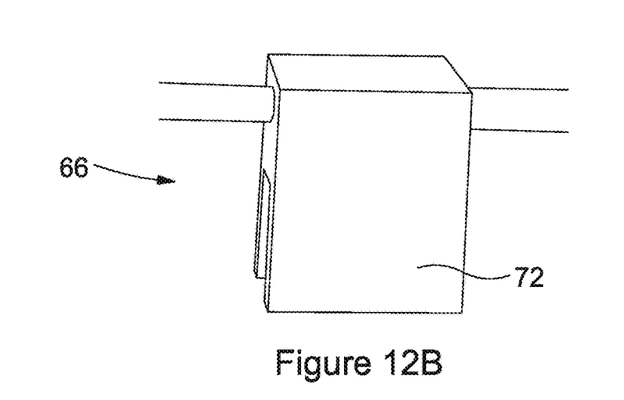
FIG. 12B shows a back view of the third member shown in FIG. 12A.
Figure 12C:
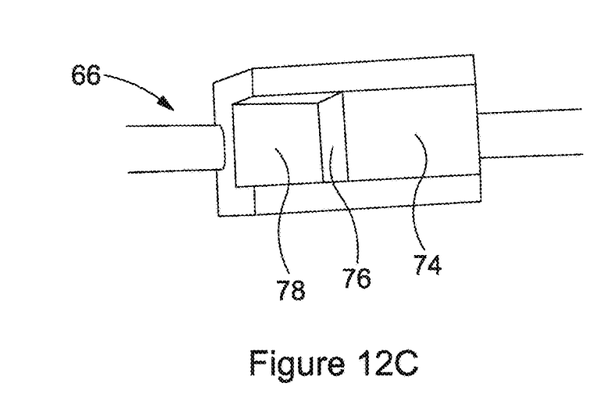
FIG. 12C shows a bottom view of the third member shown in FIGS. 12A and 12B.

Front, back and bottom views of the third block 66 are shown in FIGS. 12A, 12B and 12C. As shown, the third block 66 comprises a front portion 70, a back portion 72 and an end portion 74 having an inner surface 76 for engaging end surface 140 of drawer front F and inner surface 78 for engaging top surface 144 of drawer front F. The end portion 74 has a bore 80 through which axle 68 is disposed.

Assembly and operation of the jig assembly 110 will now be described with reference to all of FIGS. 7 to 12 and in particular with reference to FIG. 7.

In it envisaged that the jig assembly 110 is initially provided with the first block 112 and positioning arrangement 64 pre-assembled, although this need not always be the case. The jig assembly 110 is assembled by securing the handle 118 to the first and second blocks 112, 114 using the bolts 132, 158 disposed through the respective bores 130, 156 in the end portions 128, 154 of the first and second blocks 112, 114. The jig assembly 110 is then able to be manipulated using the handle 118 so that assembly 10 is positioned with respect to a drawer front F, as shown in FIG. 7.

As shown in FIG. 7, the jig assembly 110 is positioned over the upper corner of the drawer front F so that inner surface 76 of third block 66 contacts surface 140 of the drawer front F and inner surface 78 of third block 66 contacts the surface 144 of the drawer front F; third block 66 forming a corner piece of the assembly 110.

As in the assembly 10, in this position the locator holes 122, 126 are positioned to locate the first of the drill holes H and the locator holes 148, 152 are positioned to locate the second of the drill holes H, the drill holes H located a fixed distance d4 apart dictated by the handle 118. However, in this second embodiment the third block 66 permits the location for the first and second locators to be adapted by sliding the third block 66 along axle 68.

In the illustrated embodiment, the assembly 110 is configured so that the engagement between the third block 66 and the axle 68 will remain in position unless moved by a user. However, in other embodiments the assembly may further a lock arrangement for securing the third block 66 to the axle 68 at a desired position, or for securing one or more of the blocks to the door D or drawer front F.

Figure 13:
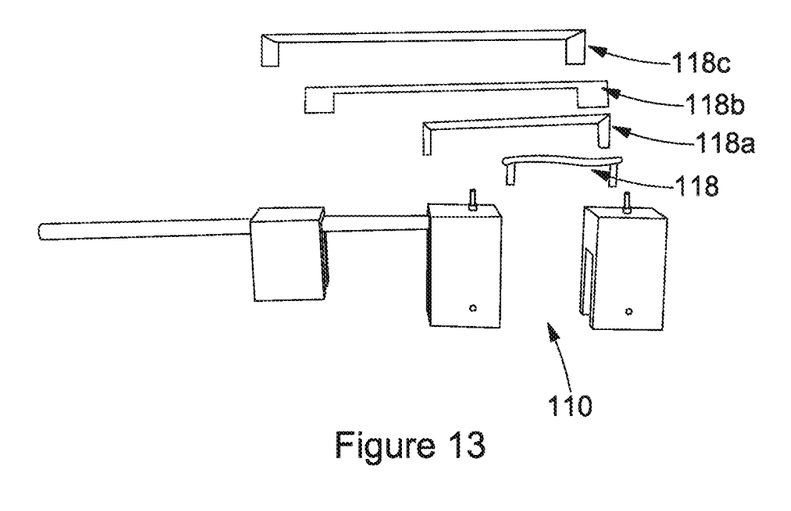
FIG. 13 shows an exemplary kit of parts comprising the jig assembly shown in FIGS. 7 to 9 and a plurality of spacer elements which may be used with the present invention.

As in the first embodiment, the assembly 110 permits attachment locations for securing a first item of furniture—such as a handle or the like—to a second item of furniture—such as a door, drawer front or the like—to be quickly and accurately determined and/or formed in the second item of furniture, thereby obviating the laborious requirement for repeated manual operations, saving time and reducing the risk of error and the resulting wastage which may otherwise occur, and that the assembly 110 can be quickly and easily reconfigured using different handles as spacers. FIG. 13, for example, shows an exemplary kit of parts comprising an assembly 110, together with a number of handles 118, 118a, 118b and 118c.

Further modifications may be made without departing from the scope of the invention.

For example, whereas in the illustrated embodiment locator holes are provided in both the front and back portions of each of the first and second blocks, it will be recognised that locators may be provided in only one of the front or back portions of each block.

Whereas in the illustrated embodiment, the spacer block is sized so that the inner surfaces of the first and second blocks contact the respective front and rear surfaces of the door, in other embodiments the spacer block may be sized so that the inner surfaces of the first and second blocks are spaced from the surfaces of the door. This has the benefit that any detrimental marking of the door by the assembly may be avoided or mitigated.

The invention claimed is:

1. A jig assembly for use in securing a first item of furniture, such as a handle, to a second item of furniture, such as a door or drawer, the jig assembly comprising:
    a first member comprising a first locator configured to indicate the position of a first attachment location between the first item of furniture and the second item of furniture; and
    a second member comprising a second locator configured to indicate the position of a second attachment location between the first item of furniture and the second item of furniture,
    wherein the first and second members are configured to be secured together by a spacer element which disposes the first and second members a predetermined distance apart so as to position the locators at the first and second attachment locations;
    wherein the spacer element comprises: the first item of furniture to be secured to the second item of furniture; an identical item of furniture to the first item of furniture; or an item of furniture having attachment locations corresponding to that of the first item of furniture; and
    wherein the first and second locators are configured to indicate the position of the first and second attachment locations when the first and second members are secured together by the spacer element.

2. The jig assembly of claim 1, wherein the jig assembly comprises the spacer element.

3. The jig assembly of claim 1, wherein the spacer element comprises a longitudinal axis, the jig assembly configured so that the longitudinal axis of the spacer element when coupled to the first and second members is perpendicular or substantially perpendicular, to a longitudinal axis of the first item of furniture when secured to the second item of furniture.

4. The jig assembly of claim 1, wherein the first locator comprises at least one of: a locator hole; a mark, a line; and a profile formed in or on the first member.

5. The jig assembly of claim 1, wherein the first locator is configured to permit the first attachment location to be marked onto and/or formed in the second item of furniture.

6. The jig assembly of claim 1, wherein at least one of:
    the first member comprises a front portion, the front portion of the first member comprising the first locator;
    the first member comprises a back portion, the back portion of the first member comprising the first locator;
    the second member comprises a front portion, the front portion of the second member comprising the second locator;

the second member comprises a back portion, the back portion of the second member comprising the second locator.

7. The jig assembly of claim 1, wherein the jig assembly comprises at least one of:
   a fastener for securing the first item of furniture to the first member; and
   a fastener for securing the first item of furniture to the second member.

8. The jig assembly of claim 1, wherein at least one of the first member and the second member are modular in construction.

9. The jig assembly of claim 1, wherein at least one of the first member and the second member comprises a unitary construction.

10. The jig assembly of claim 1, wherein the second locator comprises a locator hole; a mark; a line; or a profile formed in or on the second member.

11. The jig assembly of claim 1, wherein the second locator is configured to permit the second attachment location to be marked onto and/or formed in the second item of furniture.

12. The jig assembly of claim 1, wherein the jig assembly comprises a positioning arrangement.

13. The jig assembly of claim 12, wherein the positioning arrangement is configured to dispose the first member at:
   a given location with respect to the second item of furniture so as to position the first and second locators at a distance apart corresponding to that between the first and second attachment locations;
   at one of a plurality of discrete locations relative to the second item of furniture,
   at one of a plurality of discrete locations relative to an edge of the second item of furniture.

14. The jig assembly of claim 1, wherein the jig assembly comprises a third member and an axle, the third member slidably disposed with respect to the axle.

15. The jig assembly of claim 1, wherein the jig assembly comprises a lock arrangement.

16. A kit of parts comprising:
   the jig assembly according to claim 1; and
   at least one spacer element.

17. The kit of claim 16, comprising a plurality of the spacer elements.

18. A method comprising:
   providing a jig assembly for securing a first item of furniture, such as a handle, to a second item of furniture, such as a door or drawer front, the jig assembly comprising:
   a first member comprising a first locator configured to indicate the position of a first attachment location between the first item of furniture and the second item of furniture; and
   a second member comprising a second locator configured to indicate the position of a second attachment location between the first item of furniture and the second item of furniture;
   securing the first and second members together with a spacer element configured to dispose the first and second members a predetermined distance apart so as to position the locators at the first and second attachment locations;
   wherein the spacer element comprises: the first item of furniture to be secured to the second item of furniture; an identical item of furniture to the first item of furniture; or an item of furniture having attachment locations corresponding to that of the first item of furniture; and
   wherein the first and second locators are configured to indicate the position of the first and second attachment locations when the first and second members are secured together by the spacer element.

19. The method of claim 18, comprising disposing the jig assembly with respect to the second item of furniture.

20. The method of claim 18, comprising marking and/or forming the first and second attachment locations on the second item of furniture.

* * * * *